Oct. 24, 1961 M. E. LIBSON 3,005,399
FOOD MIXING APPARATUS
Filed Jan. 15, 1959 2 Sheets-Sheet 2
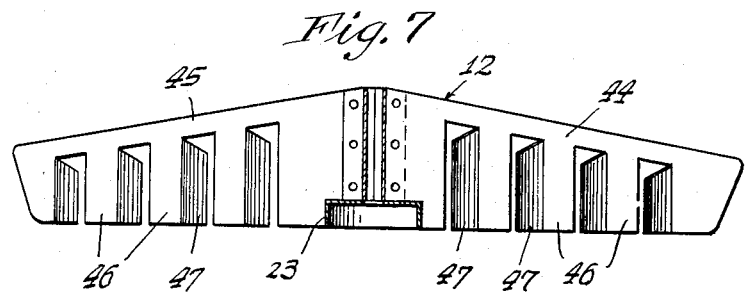
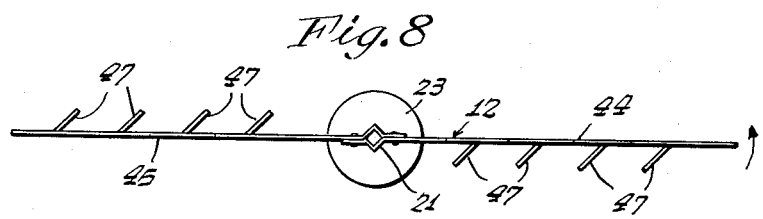
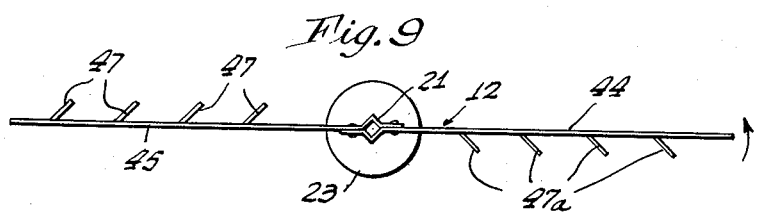
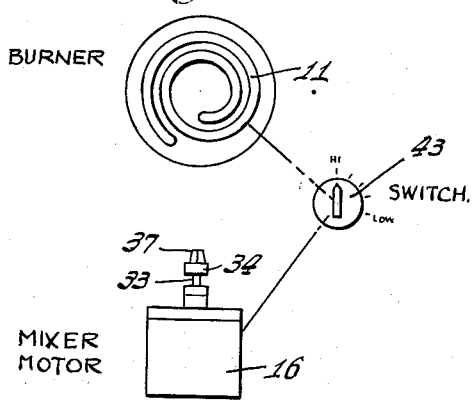
INVENTOR.
*Maurice E. Libson*
BY
*Johnson and Kline*
ATTORNEYS

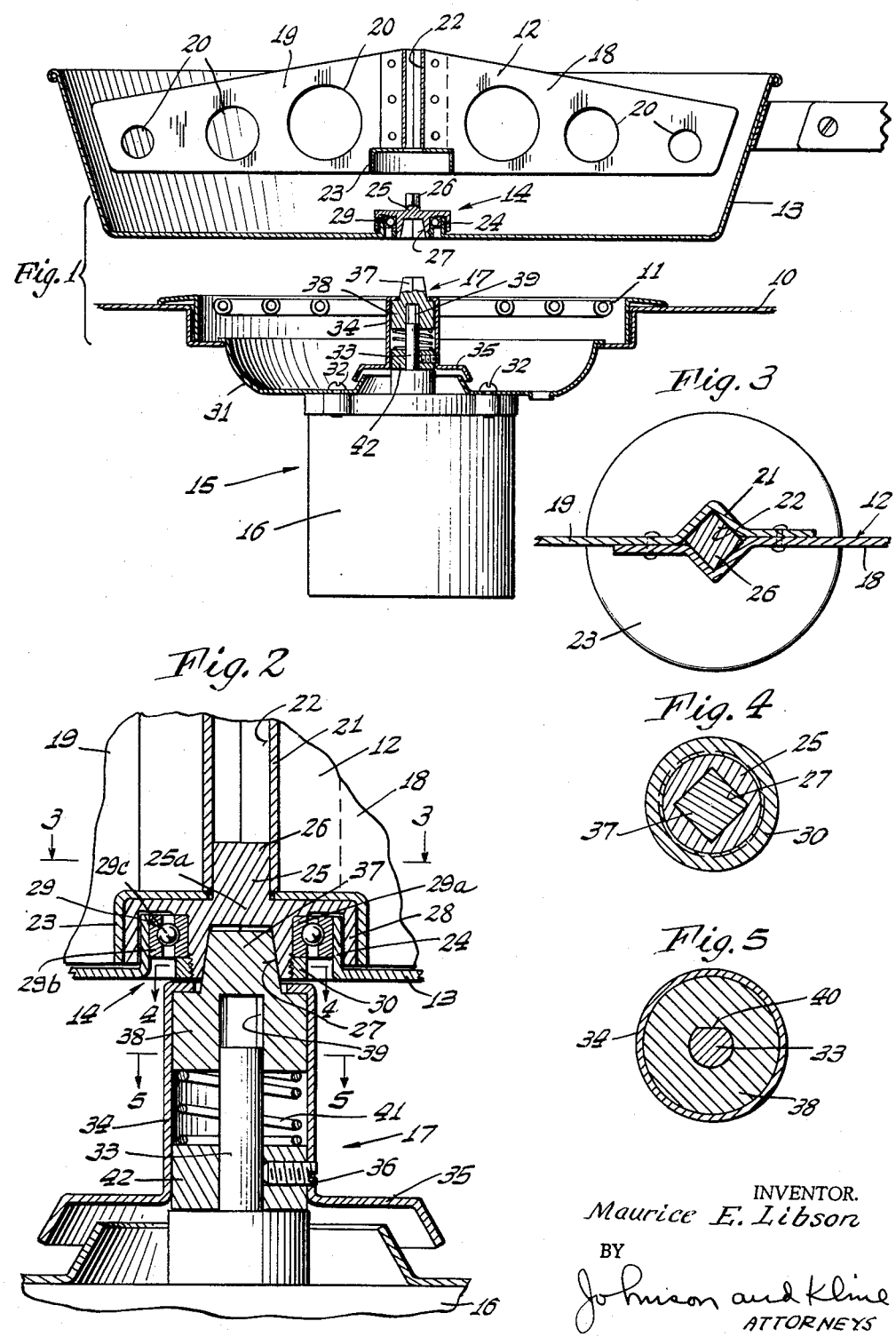

United States Patent Office 3,005,399
Patented Oct. 24, 1961

3,005,399
FOOD MIXING APPARATUS
Maurice E. Libson, 416 Crown St., New Haven, Conn.
Filed Jan. 15, 1959, Ser. No. 786,960
3 Claims. (Cl. 99—348)

This invention relates to apparatus for stirring food. More specifically, it pertains to an apparatus for stirring food in a cooking vessel while heat is being applied to a surface thereof.

In the cooking art, there are many occasions when it is necessary to stir, mix or agitate food while it is being subjected to heat, such as, for example, in preparing gravies, frostings or soups, etc. and in scrambling eggs or the like. Prior to the instant invention it was necessary for the person preparing the food to stand over a hot stove and stir the food by hand with a spoon, hand mixer or similar means, such operations often taking long periods of time and causing inconvenience, discomfort and annoyance.

The instant invention eliminates many of the problems inherent in prior art cooking methods and provides an apparatus for automatically stirring food in a cooking vessel, as heat is being applied to a surface thereof, without manual operation of the stirring device.

It is an object of the invention to provide an automatic, self-controlled, permanently mounted food mixer, which requires relatively little attention during its operation, for mixing foods in a cooking vessel as heat is being applied to a surface thereof.

It is also an object of the invention to provide an apparatus which includes stirring means adapted to be mounted in a cooking vessel on a movable integral part thereof for traversing the heated surface of the vessel and means separate from the vessel for removably engaging the movable mounting means to impart motion thereto so that the stirring means is operated.

It is another object of the invention to provide an apparatus which includes stirring means mounted on a movable integral part of a cooking vessel and means adjacent a heating element and separate from the cooking vessel for removably engaging the mounting means and imparting motion to the same so that the stirring means is caused to traverse a heated surface of the cooking vessel.

Another object of the invention is to provide in combination with a stove having a heating unit, an apparatus for stirring food in a cooking vessel as heat is applied to a surface of the vessel, which includes stirring means rotatably mounted in the vessel on a movable integral part thereof and driving means adjacent the heating unit and mounted on the stove for removably engaging the mounting part whereby the stirring means is caused to traverse the heated surface of the vessel.

Still another object of the invention is to provide in combination with a stove, having an adjustable heating unit on the surface thereof, an apparatus for stirring food in a cooking vessel and means for controlling the operation of the stirring apparatus in relation to the heat being delivered by the heating unit.

It is a further object of the invention to provide a stove having a heating unit and a driving means as operable parts thereof, with the driving means being adapted to rotate a movable integral part of a cooking vessel that mounts a stirring means, so that the stirring means is caused to traverse the heated part of the vessel.

Other objects and advantages of the invention will be apparent from the specification and claims when considered in connection with the attached sheets of drawings, illustrating one form of the invention, wherein like characters represent like parts and in which:

FIGURE 1 is an exploded elevational view of one embodiment of the invention;

FIG. 2 is an enlarged fragmentary sectional view of the driving coupling of the embodiment shown in FIG. 1;

FIG. 3 is a cross-sectional view taken in the direction of the arrows 3—3 in FIG. 2;

FIG. 4 is a cross-sectional view taken in the direction of the arrows 4—4 in FIG. 2;

FIG. 5 is a cross-sectional view taken in the direction of the arrows 5—5 in FIG. 2;

FIG. 6 is a diagrammatic view illustrating one form of the invention embodied in a stove;

FIG. 7 is an elevational view of an alternative form of stirring blade;

FIG. 8 is a plan view of the stirring blade of FIG. 7; and

FIG. 9 is a plan view showing a modification of the stirring blade of FIG. 7.

Referring now to the drawings and FIGS. 1 through 5 in particular, one embodiment of the apparatus for stirring food in a cooking vessel is shown. While the invention may be utilized in conjunction with various types of heating units such as gas burners and the like, in the illustrated form of the invention it is shown mounted in an electric stove 10 adjacent the sheathed metallic heating element 11 thereof. The mixing apparatus, which basically comprises a stirring means 12 adapted to traverse the heated surface of a cooking vessel 13, a mounting member or driven assembly 14 formed integral with the cooking vessel and a driving means 15 including a motor 16 and a driving coupling assembly 17, is adapted to be utilized to stir food as it is being cooked and is particularly adapted to the slow continuous stirring of food for long periods of time.

The stirring means 12, one form of which is shown in FIG. 1, is preferably removably mounted on the mounting member 14 in the cooking vessel for traversing the heated surface of the vessel during the operation of the apparatus. It has been found desirable to removably mount the stirring means to facilitate the washing of the cooking vessel and the stirring blade and to enable the person utilizing the apparatus to change blades as required for different operations. In the form of the invention illustrated in FIGS. 1 through 5, the stirring means 12 is shown as a blade having fins 18 and 19 each of which is provided with a plurality of openings 20 adapted to permit the food being stirred to pass therethrough. The fins, which may be formed of sheet metal or like material, are bent as at 21 (see FIG. 3) so that on being riveted or similarly secured together they form a socket 22 of rectangular cross section. At the base of socket 22, and positioned within the area defined by the outline of fins 18 and 19 is a collar 23. The collar is secured to the fins in any manner known to the art and is adapted to rotatably enclose mounting member or driven assembly 14. The mounting member, which is formed integral with the cooking vessel 13 over an opening in the bottom of the vessel defined by an upturned annular flange 24 includes a rotatable driven coupling 25 having a body portion 25a formed with a rectangular stud 26 at its upper end and a rectangular socket 27 formed in its lower end. An integral depending annular skirt 28 extends outwardly of coupling 25 and rotatably encloses upturned annular flange 24 of the cooking vessel. It should here be noted that collar 23 of stirring blade 12 is adapted to telescopically enclose skirt 28 of the driven coupling when rectangular stud 26 is received in socket 22. Positioned between body member 25a of the driven coupling and the inner face of annular upturned flange 24 of the cooking vessel are bearing means 29 which are adapted to facilitate the rotation of driven coupling 25 relative to the cooking vessel. While it will be understood that any well known bearing means may be utilized, in the illustrated form of the invention an annular bearing assembly having an inner ball race 29a, an outer race 29b and balls 29c is utilized. The ball bearing assembly 29 may be press fit or secured in any other manner known to the art within the confines of the opening defined by flange 24 of the cooking vessel. A bolt 30, or similar retaining means, retains driven coupling 25 against displacement and locks the coupling in operational engagement with inner race 29a of the bearing assembly.

It will be readily understood that the cooking vessel, with its integral driven mounting member 14 may be removed from the stove or other heating unit for storage and may be washed or similarly handled as would any conventional cooking vessel.

The driving means 15, which as aforedescribed, includes motor 16 and a driving coupling assembly 17, is permanently positioned adjacent the heating unit with which it is to be used. In the form of the invention shown in FIG. 1, motor 16 of driving means 15 is secured beneath sheathed metallic heating element 11 to the underside of a conventional drip pan 31 of stove 10 by machine screws 32 or like means. The shaft 33 of motor 16 extends upwardly through drip pan 31 and mounts driving coupling 17.

Coupling 17, which includes a cylindrical spindle 34, here shown as a hollow sleeve having a flared skirt 35 for shielding the motor from drippings as food is being cooked, is secured to driving shaft 33 for rotation therewith by a set screw 36. The outer end of driving coupling 17 is provided with a driving tip 37 having a rectangular cross section adapted to be removably received within the rectangular socket 27 of driven coupling 25. While the driving tip 37 may be formed as an integral part of spindle 34, in the illustrated form of the invention it is shown as forming an integral part of a cylindrical body member 38 which is slidably mounted within spindle 34 for longitudinal movement therein. Body 38 is provided with a longitudinally extending bore 39 adapted to receive shaft 33 of the motor and includes a longitudinal flat 40 adapted to mate with a complementary flat formed on shaft 33 for preventing relative rotation therebetween. A spring 41, having one end supported on a block 42 secured within spindle 34 engages the lower surface of body 38 biasing the same away from motor 16 so that driving tip 37 extends outwardly of the spindle and above the upper surface of heating element 11, as best shown in FIG. 1. It will be obvious to those familiar with the art that by means of this structure a conventional cooking vessel may be utilized with heating elements 11 without interference from driving means 15 or driving tip 37. If a conventional cooking vessel is placed on the heating unit, driving tip 37 will be depressed against spring 41 to a position below the upper surface of the heating elements. It will likewise be obvious that removal of the conventional cooking vessel from the surface of the heating elements will enable driving tip 37 to return to outwardly projecting position so that it may be engaged with the driven coupling of a cooking vessel 13 to drive the coupling and the stirring means mounted thereon.

In the operation of the mixing apparatus above described, motor 16 acting through driving coupling assembly 17 rotates mounting member 14 relative to cooking vessel 13, which in turn rotates stirring means 12 causing the fins thereof to traverse the heated surface of the cooking vessel. It will be obvious to those familiar with the art that the speed and direction of operation of the motor will have an important bearing on the practical utility of the mixer. For example, in stirring gravies and the like, it is desirable that the stirring be at a slow speed to evenly distribute the thickening throughout the material, and in mixing or agitating foods such as eggs, when they are being scrambled, it is desirable that the stirring means agitate the food or displace it in a number of different directions. In order to achieve the desired end results and enable the mixer of the invention to be utilized in mixing substantially all foodstuffs, it is necessary that the rotational speed of the motor be controlled and the direction of agitation regulated as required.

While universal mixing may be achieved by providing a motor which operates at an optimum speed and utilizing stirring blades of different configuration, or by using a motor which will operate first in one direction and then in the opposite direction at an optimum speed, in the preferred form of the invention a multi-circuit motor adapted to be adjusted to various speeds is utilized in combination with stirring blades of differing configuration and function. Directing our attention now to FIG. 6, the invention is diagrammatically shown in combination with an electrtic heating element 11 which is adjustable through a range of heat change by means of a selector switch 43. According to the invention, the selector switch, in addition to operating the heating element 11 of the stove, also operates the motor 16 of the mixing apparatus by selecting the desirable circuit and speed of the motor to operate at a given heat. In this manner the speed of rotation of the stirring means or blade 12 is regulated relative to the heat being delivered by the heating element. It will, of course, be understood that switch means (not shown) may be included in the circuit to disconnect the operation of motor 16 from the selector switch 43 when heating element 11 is being utilized with a conventional cooking vessel. It will also be understood that where the mixing apparatus of the invention is associated with a gas burner or the like, the motor 16 may be regulated by switch means which are unrelated to the heat control of the stove.

The operation of the mixing apparatus at a controlled speed, as accomplished by utilizing a multi-speed motor, overcomes the problems presented when mixing a foodstuff which need only be stirred in one direction; by utilizing stirring blade 12, as shown in FIG. 1, a steady continuous stirring can be achieved in one direction. Where it is desirable to agitate or mix the food in different directions, as in the scrambling of eggs, stirring means or blades 12 of the type shown in FIGS. 7 through 9 may be utilized. In FIGS. 7 and 8, stirring means 12 is shown to include fins 44 and 45 of comb-like construction. Each of the teeth 46 of the comb are provided with flaps 47 extending angularly away from the plane of the fin toward the collar 23 of the stirring means. When the stirring blade 12 is rotated counterclockwise in the direction of the arrow, the food in the cooking vessel will be displaced toward the center thereof. As the food flows out toward the periphery of the vessel it will again and again be returned to the center of the same. In FIG. 9 a modification of this blade is shown wherein the fin 45 is provided with flaps 47 as aforedescribed while the fin 44 is provided with flaps 47a directed away from collar 23 of the stirring means. Rotation of the blade of FIG. 9 in the direction of the arrow will result in the food first being thrown inwardly toward the center of the cooking vessel and thereafter outwardly toward the periphery of the same.

In view of the fact that the stirring means 12 are removably mounted in cooking vessel 13, it will be readily understood that substantially all cooking operations, which require stirring as heat is being applied to a surface of the cooking vessel, may be achieved by merely changing stirring blades and utilizing one which performs the desired function.

Thus, among others, the several objects of the invention as aforenoted are achieved. Obviously, numerous changes in the structure may be resorted to without departing from the spirit of the invention as defined by the claims.

I claim:

1. In combination an electric heating element adjustable to a plurality of predetermined heat levels forming a substantially flat supporting surface, a cooking vessel having a substantially flat bottom surface in heat transfer relationship therewith and supported thereon, stirring means adapted to be mounted in said vessel for traversing the bottom surface thereof, means wholly within said vessel secured to said bottom surface thereof and movable relative thereto for mounting said stirring means, drive means adjustable to a plurality of predetermined speeds fixedly mounted adjacent said heating element and having retractable means projecting upwardly through said supporting surface adapted to removably operably engage said mounting means for imparting motion thereto whereby said stiring means is caused to traverse said bottom surface, and means for adjusting said heating element through said predetermined heat levels, said adjusting means being connected to said drive means to adjust the speed thereof in relation to the heat of said heating element.

2. In combination an electric heating element forming a substantially flat supporting surface adapted to be adjusted to a plurality of predetermined heat levels, a cooking vessel having a substantially flat annular bottom surface, said bottom surface having an upwardly turned flange defining the opening therein and being in heat transfer relationship with said element and removably supported thereon, a stirring blade adapted to be mounted in said vessel for traversing the bottom surface thereof, means wholly within said vessel secured to said flange and rotatable relative to said bottom surface for mounting said stirring blade, a multi-speed motor fixedly mounted adjacent said heating element, coupling means operably connected to said motor and normally projecting centrally upwardly through said supporting surface, means biasing said coupling means into normally projecting position, said coupling means in normal position being adapted to extend through said bottom surface of said vessel to removably operably engage said rotatable mounting means for imparting motion thereto whereby said stirring means is caused to traverse said bottom surface, and selective control means for adjusting said heating element, said selective control being connected to said motor to regulate the speed thereof in relation to the heat of said heating element.

3. In combination with a stove having an electric heating element adapted to be operated at a plurality of different predetermined heat levels in the upper surface thereof forming a substantially flat supporting surface; a cooking vessel having a substantially flat annular bottom surface in heat transfer relationship with said element and including stirring means mounted therein for traversing said heated surface, said bottom surface having an integral upturned flange defining the opening therein, means wholly within said vessel and secured to said upturned flange and rotatable relative to said bottom surface for mounting said stirring means, a multi-speed motor centrally of said heating element, means between said element and said motor for shielding the latter, coupling means connected to said motor and being normally resiliently biased upwardly to project through said element, said coupling means in normally projecting position projecting through said opening in said bottom surface of said vessel and removably engaging said mounting means for imparting motion thereto whereby said stirring means is caused to traverse said bottom surface and means for regulating the heat of said heating element, said regulating means being connected to said motor to operate the same at a predetermined speed in relation to the heat of said element.

References Cited in the file of this patent

UNITED STATES PATENTS

| | | |
|---|---|---|
| 1,786,005 | Cretors | Dec. 23, 1930 |
| 2,267,802 | Purdy | Dec. 30, 1941 |
| 2,530,455 | Forss | Nov. 21, 1950 |
| 2,557,087 | Forss | June 19, 1951 |
| 2,743,910 | Melville | May 1, 1956 |
| 2,798,700 | Corbett et al. | July 9, 1957 |
| 2,867,420 | Potts | Jan. 6, 1959 |